UNITED STATES PATENT OFFICE.

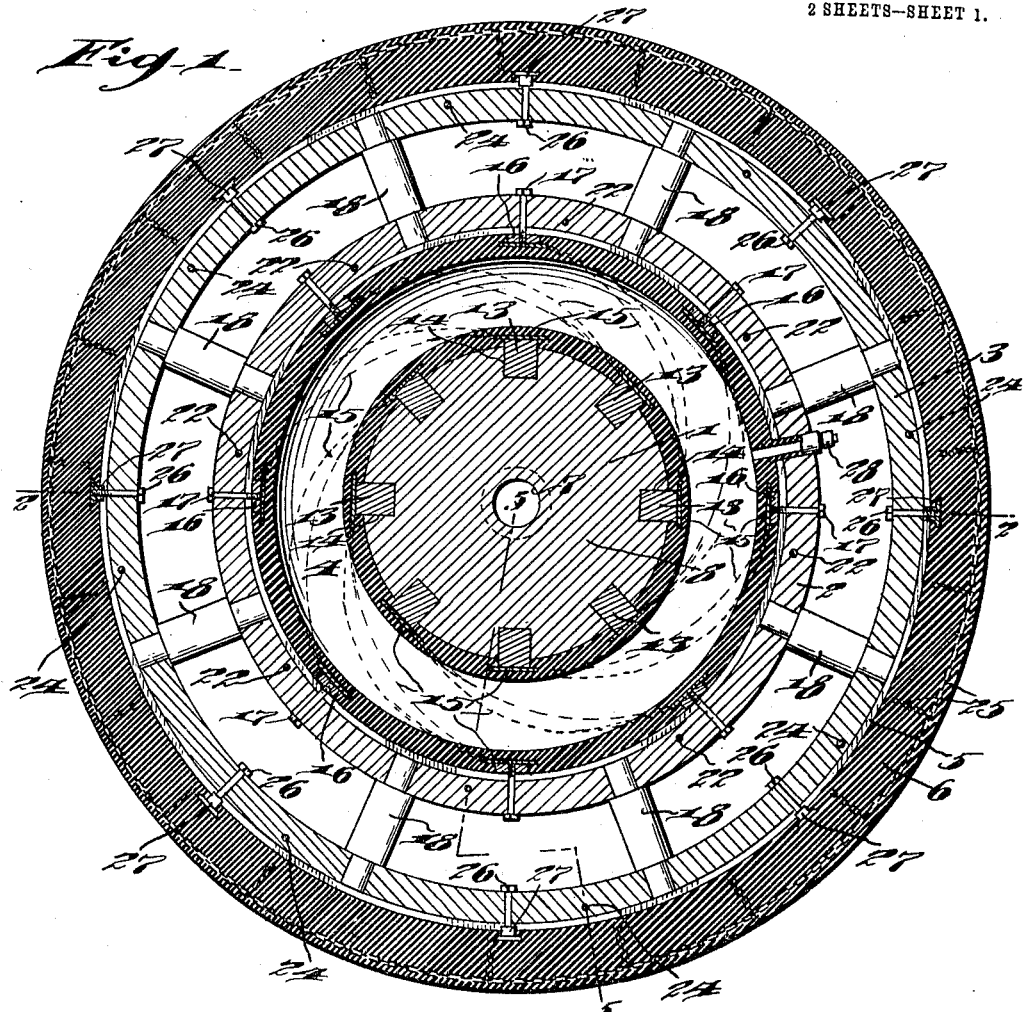

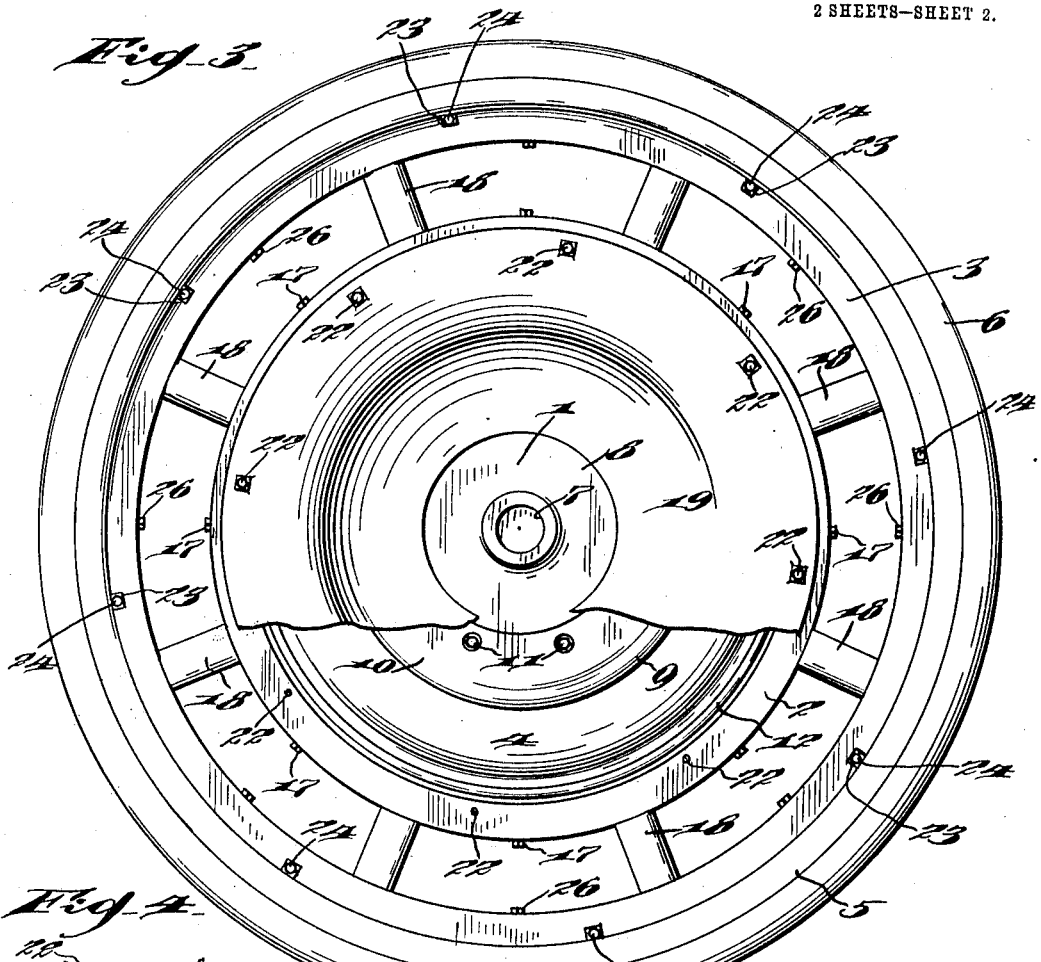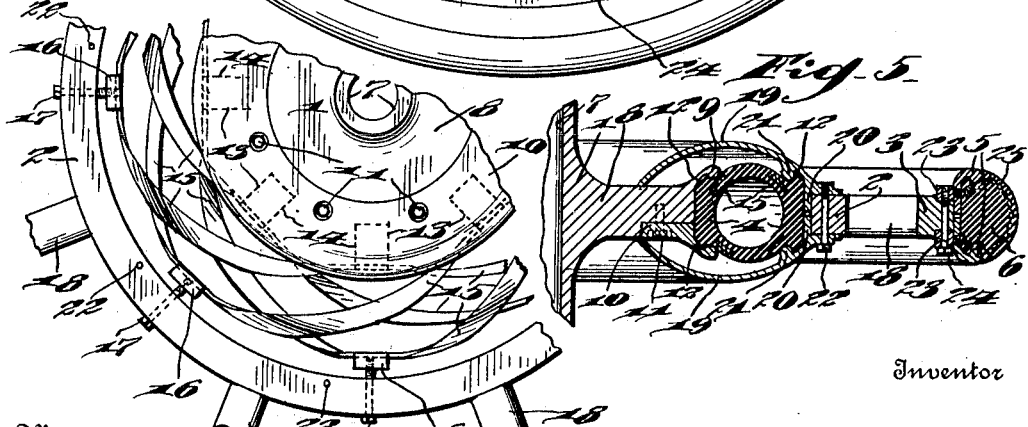

WESLEY PHILLIPS, OF CAPE MAY, NEW JERSEY, ASSIGNOR, BY MESNE ASSIGNMENTS, OF ONE-HALF TO HARRY PHILLIPS, OF GREENWICH, CONNECTICUT.

WHEEL.

1,019,832.    Specification of Letters Patent.    Patented Mar. 12, 1912.

Application filed May 29, 1911. Serial No. 630,192.

*To all whom it may concern:*

Be it known that I, WESLEY PHILLIPS, a citizen of the United States, residing at Cape May, in the county of Cape May and State of New Jersey, have invented certain new and useful Improvements in Wheels, of which the following is a specification.

My invention relates to improvements in wheels, and more particularly to wheels adapted for motor vehicles and the like, the object of the invention being to provide a wheel which is adapted to cushion the shocks and jars, and which dispenses with the necessity for a pneumatic tire around the outside of the wheel.

A further object is to provide a wheel with an improved pneumatic tube between the hub and the tire of the wheel to sustain the jars and vibrations, and provide an improved arrangement of steel bands in connection with the tube to sustain the rotary strains imparted to the wheel as the axle turns. In other words, when the hub portion turns and the wheel is supporting the weight of the vehicle, the springs sustain the strain which the hub portion imparts to the outer part of the wheel, and they are very essential as the rubber tube would not be sufficiently strong to withstand this tension. Furthermore, these steel bands are adapted to assist the pneumatic tube in cushioning the wheel.

A further object is to provide an improved construction of wheel with an improved arrangement of ring, felly, and hub, and provide in the ring and hub portion, improved means for holding and protecting the pneumatic tube.

A further object is to provide a wheel of this character having an improved arrangement of parts, whereby a pneumatic tube is supported between the hub and the tire, and provide improved means for holding the tube and the tire on the wheel.

With these and other objects in view, the invention consists in certain novel features of construction and combinations and arrangements of parts, as will be more fully hereinafter described and pointed out in the claims.

In the accompanying drawings: Figure 1, is a view in vertical longitudinal section illustrating my improvements. Fig. 2, is a view in section on the line 2—2 of Fig. 1. Fig. 3, is a view in side elevation showing one of the guard rings. Fig. 4, is a fragmentary view in elevation showing the arrangement of spring bands and their connection with the hub of the ring, but leaving the rubber of the tube out of the view for purposes of clearness. It is to be understood that this view shows an impossible arrangement, because the springs are always molded in the rubber tube, and form an integral part of the rubber tube, and Fig. 5, is a sectional view on the irregular line 5—5 of Fig. 3.

My improved wheel comprises a central member 1, which I shall term the hub, a circular ring 2 of an appreciably greater diameter than hub 1, and a felly 3, of appreciably greater diameter than ring 2. Between ring 2 and hub 1, my improved pneumatic tube 4 is located. On the felly 3, a clencher rim 5 is secured and holds a tire 6 in place, all of these parts being hereinafter described in detail.

The hub 1 is preferably of steel, and comprises a central elongated sleeve or bearing 7 for the axle (not shown), and around this bearing a disk-like enlargement 8 is provided which at one edge is made with an integral annular flange 9, constituting one edge of a clencher rim. This clencher rim is completed by a removable ring 10, which is secured in a recessed portion of the hub 1 by means of screws 11, and said flange 9 and ring 10 together form a clencher rim to confine the beads 12 on pneumatic tube 4. To further secure tube 4 on hub 8 and prevent any rotary movement of tube 4 on the hub 8, wedge shaped metal inserts 13 are molded into tube 4, and are located in pockets 14 in hub portion 8. These blocks 13 are not only molded in the tube 4, but they are rigidly secured by welding or otherwise to spring metal bands 15. These spring bands are also secured by welding or otherwise to metal blocks or inserts 16 in the outer portion of tube 4. The particular arrangement of these spring bands is shown most clearly in Fig. 4, where it will be noted that the bands are to a certain extent, continuous, and curve in conformity to the curvature of the tube as they extend longitudinally from inner block 13 to an outer block 16, and from the latter again to inner block 13, and so on, throughout the length of the tube, forming a plurality of longitudinal and lateral tensioning devices to sustain the longitudinal strain on the tube when motion is imparted from the hub to the outer parts of the wheel. These spring bands also strengthen the tube and add to the efficiency of the tube in supporting and cushioning the wheel. To rigidly secure the ring 2 to the tube 4, the blocks 16 are provided with screw-threaded openings to receive screws or bolts 17, which extend through ring 2 as clearly shown in Fig. 2.

A circular series of spokes 18 connect ring 2 and felly 3, and are secured in said ring and felly by ordinary mortises and tenons as shown. To protect the pneumatic tube 4, I employ two guard rings 19. These rings bow outward so as to accommodate tube 4, and its mountings, and are each provided with inwardly projecting circular flanges 20, which project between the tube 4 and ring 2, and are clamped in this position by means of screws 17 above referred to. Furthermore, the inner faces of these rings are made with integral flanges 21, which together constitute, in effect, a clencher rim which clenches the outer beads of the tube, it being understood that said tube 4 is provided at its inner and outer faces with similar beads, so that these beads are both clenched to firmly connect the tube with the hub 1, and ring 2 respectively. These rings 19 are rigidly clamped against ring 2 by means of screws or bolts 22, as clearly shown in Fig. 5, said bolts projecting through one guard ring, through the ring 2, and screwed into the opposite guard ring 19.

The clencher rim 5 above referred to, which is located around the felly 3, comprises two members having blocks 23 secured thereto, and through these blocks, which are positioned in recesses in the felly, bolts or screws 24 are secured, said bolts passing through one block, through openings in the felly, and screwed into the block of the other tire section, so as to clamp the rim on the outer tire 6. This outer tire 6 is composed of solid rubber, having a chain insert 25, which extends longitudinally of the tire, and is provided with lateral loop portions so as to strengthen the tire and lengthen its life. In this tire 6, metal blocks or inserts 27 are molded, and have screw-threaded openings for the reception of screws 26, which are projected through openings in the felly, between the rim sections 5 and into said blocks 25.

Pneumatic tube 4, as well as the outer tire 6, may be made of rubber and canvas or various other compositions suitable for the purpose and the pneumatic tube 4 will, of course, be provided with an inflating valve 28 as clearly shown in Fig. 1.

In operation, supposing the wheel to be one of the driving wheels of an automobile hub, which will of course, be secured to turn with the axle. As the axle turns, hub 1 will be turned, and through the medium of spring strips 15 and the other connecting mechanism above described, the entire wheel will turn with the hub. At the same time, these spring strips 15 will assist the air in the tube 4 to cushion the body of the machine, and it will be noted by reason of the arrangement of the spring strips 15, that this wheel is adapted to operate with equal efficiency in either direction, said strips serving to supply the necessary strength to the tube to withstand the rotary strains to which it is necessarily subjected.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a wheel, the combination with a hub, and an outer annular portion, of a pneumatic tube located between the hub and the outer portion, spiral metal inserts in the tube, and extended longitudinally and curved around within the tube in conformity with the shape of the tube, and devices securing said metal inserts to the hub and the outer portion respectively, substantially as described.

2. In a wheel, the combination with a hub and an outer annular portion, of a pneumatic tube located between the hub and the outer circular portion and secured to both, and spring metal spiral strips forming a part of the tube, and extended longitudinally and curved around within the tube in conformity with the shape of the tube, and connected to the hub and the outer annular portion, substantially as described.

3. In a wheel, the combination with a hub, an outer annular portion, and a pneumatic tube located between the hub and said outer portion, of metal blocks molded in the outer and inner faces of the tube, devices securing said blocks to the hub and outer portion respectively, and spring metal bands connecting the outer and inner blocks respectively, and extended longtiudinally and curved around within the tube in conformity with the shape of the tube, substantially as described.

4. In a wheel, the combination with a hub, an outer annular portion, and a pneumatic tube located between the hub and said outer portion, of metal blocks molded in the outer and inner faces of the tube, device securing said blocks to the hub and outer portion respectively, spring metal bands connecting the outer and inner blocks respectively, said spring bands molded in the tube, and extended longitudinally and curved around within the tube in conformity with the shape of the tube, substantially as described.

5. In a wheel, the combination with a hub, and an outer annular portion, of a pneumatic tube located between the hub and the outer portion, spiral metal inserts in the tube, and extended longitudinally and curved around within the tube in conformity with the shape of the tube, devices securing said metal inserts to the hub and the outer portion respectively, guard rings secured to the said first-mentioned ring and confining the pneumatic tube, said tube having beads at its inner and outer edges, and said hub and said guard rings constructed to form clencher rims to engage said beads, substantially as described.

6. In a wheel, the combination with a hub and an outer annular portion, of a pneumatic tube located between the hub and the outer circular portion and secured to both, spring metal spiral strips forming a part of the tube, and extended longitudinally and curved around within the tube in conformity with the shape of the tube, and connected to the hub of the outer annular portion, guard rings secured to the said first-mentioned ring and confining the pneumatic tube, said tube having beads at its inner and outer edges, and said hub and said guard rings constructed to form clencher rims to engage said beads, substantially as described.

In testimony whereof I have signed my name to this specification in the presence of two subscribing witnesses.

WESLEY PHILLIPS.

Witnesses:
R. H. KRENKEL,
CHAS. E. POTTS.

---

Copies of this patent may be obtained for five cents each, by addressing the "Commissioner of Patents, Washington, D. C."